Dec. 29, 1959   A. N. ORMOND   2,918,816
FORCE MEASURING INSTRUMENT
Filed May 19, 1958   3 Sheets-Sheet 1

INVENTOR.
ALFRED N. ORMOND
BY Elliott & Pastoriza
ATTORNEYS

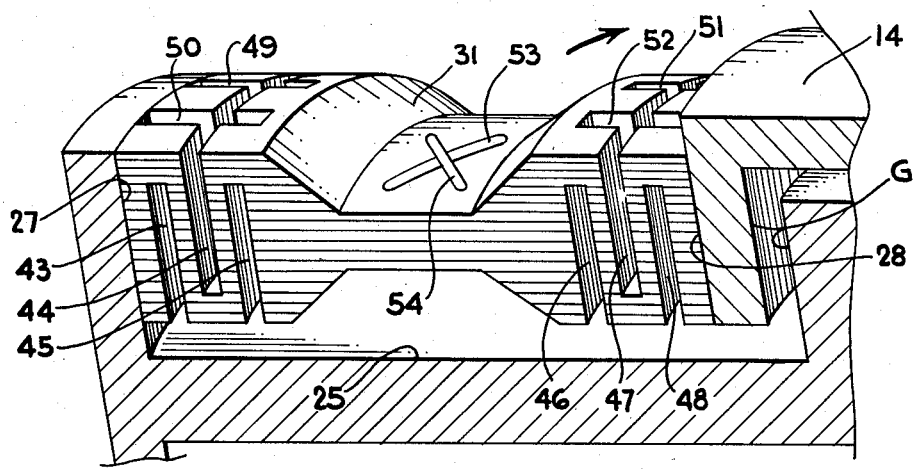

Dec. 29, 1959  A. N. ORMOND  2,918,816
FORCE MEASURING INSTRUMENT
Filed May 19, 1958  3 Sheets-Sheet 3

INVENTOR.
ALFRED N. ORMOND
BY *Elliott & Pastoriza*
ATTORNEYS

United States Patent Office 2,918,816
Patented Dec. 29, 1959

2,918,816

FORCE MEASURING INSTRUMENT

Alfred N. Ormond, Inglewood, Calif.

Application May 19, 1958, Serial No. 736,278

6 Claims. (Cl. 73—147)

This invention relates generally to force measuring instruments and more particularly to an improved six-component strain gauge balance system for use in high pressure wind tunnels.

In testing an aircraft structure in a wind tunnel, it is common practice to employ individual load cells secured to the structure and responsive, respectively, to the various forces and moments generated in the structure. Thus, the drag, lift, and side forces will result in deformations of certain of the load cells while the roll, pitch, and yaw moments will result in different deformations of certain others of the load cells. These deformations are detected and measured by means of strain gauges secured to the load cells.

It is desirable to measure simultaneously the six major forces and moments corresponding to the six degrees of freedom of any three dimensional body under test. To this end, conventional balances or so-called six-component strain gauge instruments have been designed around groups of individual load cells precisely machined and assembled into a composite structure. The major problem encountered in such designs is that of proper isolation between the individual load cells. For example, it is important that deformations in some of the load cells resulting from lift forces not result in any deformations in others of the load cells employed for measuring the drag and side forces or the various moments, as otherwise the interaction will result in erroneous readings from these latter cells. Further, it is important to isolate interaction resulting from thermal expansion and contraction of the cells and adjoining structure.

To isolate each load cell as much as possible from the deformations of each of the other load cells and still provide a composite six-component instrument is an extremely difficult problem. The solutions proposed thus far contemplate the provision of extremely flexible couplings between the cells to be isolated from each other so that movements of one cell are absorbed in the flexible couplings rather than communicated to the other cells. Thus, a high degree of isolation can be realized by providing sufficient flexibility. On the other hand, this flexibility will limit seriously the structural strength of the complete unit. As a consequence, it would require a relatively large increase in the size of present balances to sustain the loads without failure.

In the case of hypersonic wind tunnels, presently available instruments are hardly adequate. In order to obtain the high wind velocities required to create hypersonic flow, the throat area of the tunnel must remain relatively small whereas the forces or loads imposed upon the aircraft structure or test model in the throat increase as an exponential function of the air velocity. As a consequence, conventional balances small enough to fit into hypersonic wind tunnel installations are not strong enough to withstand the applied loads.

With the foregoing in mind, it is a primary object of the present invention to provide an improved six-component strain gauge balance instrument for high speed, high pressure blow down tunnels where a high normal force capacity is required from a relatively small diameter instrument.

More particularly, it is an object to provide an improved instrument capable of measuring forces and moments of considerably greater magnitude than presently available instruments of the same outside overall dimension.

Another important object is to provide an instrument capable of simultaneously measuring the three linear forces and the three rotational forces or moments corresponding to the six degrees of freedom of a three dimensional body simultaneously and with greatly reduced interaction per unit of load as compared to conventional instruments of corresponding size.

More specifically, it is an object to provide a high performance six-component strain gauge balance instrument for use in hypersonic wind tunnel testing capable, for example, of indicating normal forces of the order of magnitude of five thousand pounds within an overall accuracy of .5% of the full scale load and yet having an outside diameter of only approximately one and one-half inches.

These and many other objects and advantages of this invention are attained by the utilization of rigidity in place of flexibility in the load cells of the instrument. This approach is somewhat unconventional inasmuch as successful balance design has long been associated with flexibility since flexibility offers isolation from interaction between the various load cells. By utilizing rigidity, the actual physical movements of the load cells are decreased for a given high load and thus interaction is automatically diminished. Actually, in order to completely eliminate interactions, it would be desirable to have the load cells themselves infinitely rigid in the direction of the principal load and completely flexible or compliant to end rotations and transverse deflections. This ideal, however, cannot be achieved in practice. The instant invention thus constitutes a compromise possessing relative quantities of rigidity and flexibility resulting in a greatly improved instrument. Thus, interactions or intercouplings are minimized by reducing interrelated deflections through increased rigidity in the direction of the principal load.

To meet the foregoing design approach, the preferred embodiment of the present invention takes the form of a symmetrical structure employing rigid load cells in which many of the interactions are canceled out. The instrument itself comprises generally an outer sleeve within which is disposed a core. The outside diameter of the core is less than the inside diameter of the sleeve so that there remains an annular gap. The core itself is held in a stationary position by means of a mandrel support while the sleeve is secured to the body subjected to the various forces and moments to be measured; for example, to a predetermined area of an aircraft test model. The outer sleeve is thus subject to lift, side, and drag forces as well as roll, pitch and yaw moments. By interconnecting the core and sleeve with different load cells, these various forces applied to the sleeve can be measured. The geometry and placement design is such that maximum isolation from interaction is realized.

Briefly, the moments resulting in roll are detected by an annular torsion load cell having its circumferential end portions secured to the ends of the sleeve and core respectively, so that torsion strains as a consequence of roll moments are established in the load cell. These torsional strains are then detected by suitable strain gauge elements secured to the load cell in a conventional manner.

Lift and side forces in turn are detected by means of guided cantilevered load cells passing diametrically through the sleeve and core, each having one end secured rigidly to the sleeve and its other end secured rigidly to the core. Two of these guided cantilevered load cells are disposed at right angles to the other two. These same load cells may also provide an indication of yaw and pitch moments by having them disposed in spaced relation along the longitudinal axis of the body under test and simply measuring the difference between the load readings.

The drag force is detected by suitable rhombic shaped load cells axially positioned in a recessed area in the center portion of the core. These cells are secured between the core and outer sleeve by means of a support structure passing from the outer sleeve through a suitable passage to the recessed area in the core.

A better understanding of the principles of the invention as well as its many additional features and advantages will be had by referring now to the following detailed description in conjunction with the accompanying drawings illustrating a preferred embodiment of the instrument and in which:

Figure 4 is an enlarged fragmentary perspective view of that portion of the instrument enclosed within the circular arrow 4 of Figure 2;

Figure 5 is a view partly in cross section taken in the direction of the arrows 5—5 of Figure 2;

Figure 6 is another view partly in cross section taken in the direction of the arrows 6—6 of Figure 2;

Figure 7 is an enlarged fragmentary perspective view partly broken away of that portion of the instrument enclosed within the circular arrow 7 of Figure 2;

Figure 1:
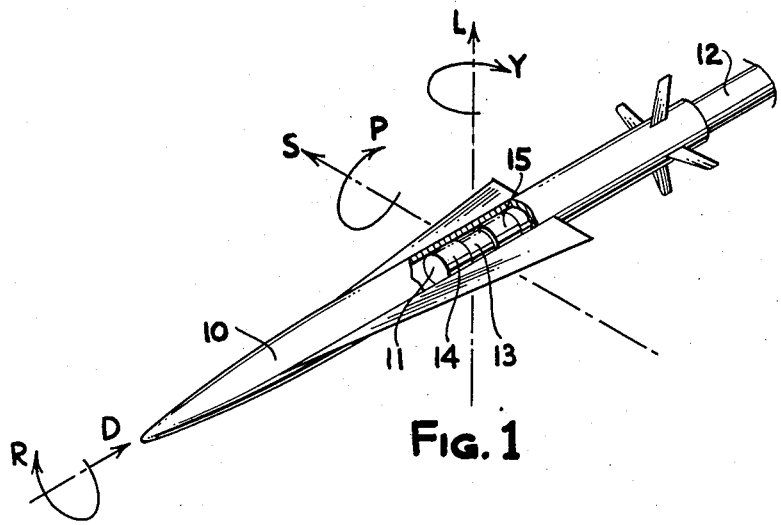
Figure 1 is a perspective view, partly broken away, of an aircraft structure illustrating the placement of the improved force measuring instrument of the present invention.

Referring first to Figure 1, there is illustrated by way of example a supersonic aircraft test model 10 subject to various forces and moments as a consequence of high speed air flow thereover. These forces and moments are measured by means of a force measuring instrument 11 designed in accordance with the present invention. The instrument 11 is supported in part by a mandrel 12 passing through the hollow interior fuselage of the missile 10 and out the tail portion to a stationary base (not shown). The instrument 11 is disposed near the center of gravity of the structure 10 and comprises an outer sleeve having a reduced diameter central portion 13 free of the fuselage and increased diameter end portions 14 and 15 rigidly secured to the fuselage. The various forces and moments to which the test model 10 are subject are thus communicated to the outer end portions of the sleeve of the instrument 11 through the securement of the end portions 14 and 15 of this outer sleeve to the body.

In Figure 1, there is schematically illustrated by the dashed-dot lines and the circular arrows the various forces and moments to be measured. For example, the roll moment is indicated by the circular arrow R, the pitching moment by the circular arrow P, and the yaw moment by the circular arrow Y. The linear forces to which the test model is subject are indicated by the arrow D representing the drag, the arrow S representing the side force, and the arrow L representing the lift force.

Figure 2:
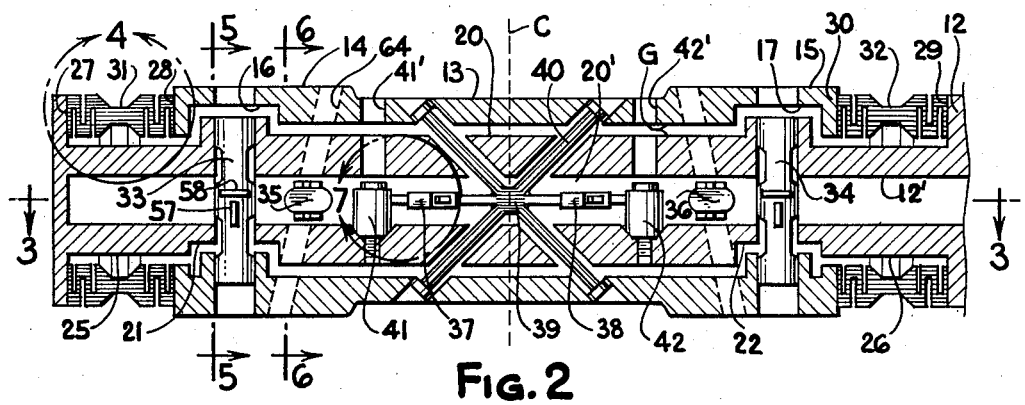
Figure 2 is an enlarged elevational view partly in cross section of the instrument shown in Figure 1.
Figure 3:
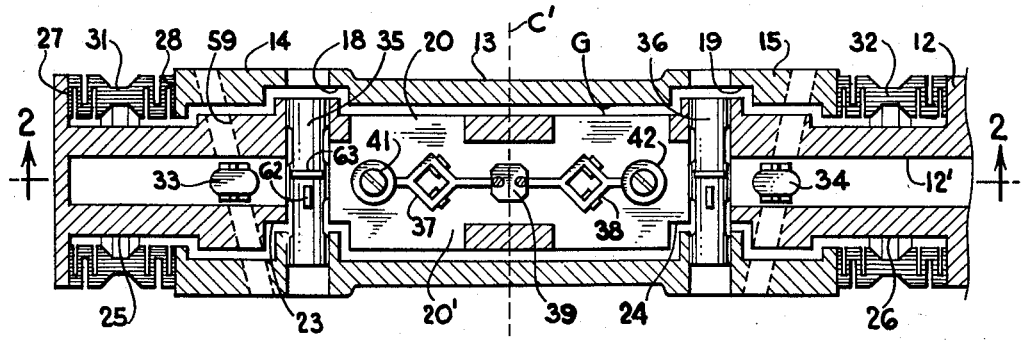
Figure 3 is another view partly in cross section taken in the direction of the arrows 3—3 of Figure 2.

Referring now to the detailed cross sectional views of Figures 2 and 3, it will be noted that the outer sleeve structure includes a uniform inside diameter portion in its central region 13 and two off-set bore portions 16 and 17 in the increased diameter end portions 14 and 15. The sleeve also includes a second pair of off-set bore portions 18 and 19, as best shown in Figure 3, spaced inwardly of the off-set portions 16 and 17 and off-set axially in a direction ninety degrees from the off-sets 16 and 17.

The instrument includes a central core 20 co-axially positioned within the outer sleeve portions 13, 14, and 15 and of an outside diameter less than the inside diameter of the outer sleeve to leave an annular gap G. The core 20 similarly includes off-set core portions 21 and 22 in positions corresponding to the off-set bore portions 16 and 17 of the sleeve, and off-set core portions 23 and 24 corresponding in position to the off-set bore portions 18 and 19 as shown in Figure 3. The latter off-set core portions are, therefore, off-set in a direction at ninety degrees to the off-set core portions 21 and 22.

In order to enable assembly of the core in a co-axial position within the sleeve, the outer sleeve is initially formed in two semi-cylindrical sections which are disposed about the core with the various off-sets correspondingly positioned and the outer sleeve then seam welded to provide a rigid cylindrical structure surrounding the core.

As shown in both Figure 2 and 3, the outer end portions of the core 20 beyond the outer off-set portions include reduced diameter surfaces 25 and 26. The reduced diameter surface 25, as shown in Figure 2, terminates in an end flange providing an annular surface 27 in spaced opposing relationship to one end 28 of the sleeve. The other reduced diameter end portion of the core shown at 26 is integral with the mandrel 12 and defines therewith an annular shoulder 29 in spaced opposing relationship to the other end 30 of the sleeve.

By designing the core and sleeve in the foregoing manner, suitable annular torsion load cells indicated at 31 and 32 adjacent opposite ends of the core and sleeve may have their circumferential end portions secured respectively to the core and sleeve portions 27, 28, and 29, 30. Moments tending to result in roll of the aircraft test model 10 will be communicated to the outer sleeve portions 14 and 15. On the other hand, the inner core will be held rotationally stationary by the mandrel 12 and thus the load cells 31 and 32 will be subject to torsional strains.

To measure the lift force and pitching moment, there are provided a first pair of guided cantilevered load cells 33 and 34 disposed within suitable axially spaced, parallel diametric bores passing through the offset bore portions 16 and 17 and correspondingly offset core portions 21 and 22. As a consequence of the offset geometry, these guided cantilevered load cells may each have one end secured to the sleeve and the other end secured to the core and still be centered with respect to the central longitudinal axis of the sleeve and core. With the guided cantilevered load cells 33 and 34 secured to the sleeve and core as shown, it will be evident that lift force on the test model 10 will tend to move the sleeve upwardly as viewed in Figure 2 and thus establish compression strains in both of the load cells 33 and 34. Also, any moment tending to result in pitch will be communicated to the outer sleeve end portions 14 and 15 resulting in a difference in the strains established in the load cells because of their axial spacing. The difference between the force readings obtained from these cells will then enable the pitch moment to be computed.

Side force and yaw moment are similarly detected by a second pair of guided cantilevered load cells 35 and 36 best seen in Figure 3. As shown, these load cells are disposed in axially spaced, parallel diametric bores spaced inwardly and at right angles to the bores containing the load cells 33 and 34 of Figure 2. Further, as in the case of Figure 2, the diametric bores pass through the outer sleeve and core at the offset portions thereof so that the securement of the cantilevered elements 35 and 36 to the outer sleeve and core, respectively, can be achieved and still have these load cells properly centered with respect to the central longitudinal axis of the sleeve and core.

Finally, the drag force is arranged to be detected by rhombic shaped load cells 37 and 38 illustrated in both Figures 2 and 3. These two load cells are connected within a recessed area 20' of the core and have their inner ends secured to a first securing means 39 rigidly supported as by a supporting rod 40 to the reduced diameter central portion 13 of the outer sleeve. Four such supporting rods similar to rod 40 are illustrated in Figure 2 and extend through suitable passages of sufficient diameter that there is no contact between these rods and the passages in the central core portion. The outer ends of the rhombic shaped load cells 37 and 38 are secured, respectively, to second and third securing means 41 and 42 rigidly connected to the core portion. By this arrangement, the drag force acting on the test model 10 will tend to move the outer sleeve axially to the right as viewed in Figures 2 and 3 and thus establish tension forces in the load cell 37 and compression forces at corresponding points in the load cell 38.

It will be noted in Figures 2 and 3 that both the outer sleeve and core are absolutely symmetrical with respect to a plane passing centrally through the core and sleeve normal to the longitudinal axis of the core and sleeve. In Figure 2, this plane is indicated by the dashed line C and in Figure 3 by the dashed line C'.

Certain details of the various load cells and the manner in which strain gauge elements are secured thereto will now be described in connection with Figures 4, 5, 6, and 7.

Figure 4 illustrates in enlarged cutaway perspective view the torsion load cell 31. Because of the symmetry of the entire instrument, the load cell 32 is identical and, therefore, description of the cell shown in Figure 4 will suffice for both load cells. As shown, the circumferential end portions are rigidly welded to the inner surface 27 of the annular end flange and sleeve end 28 and are provided with three staggered circumferentially running slots 43, 44, and 45 extending in radial directions adjacent the end flange 27 and three similar circumferentially running slots 46, 47, and 48 adjacent the sleeve end 28. There are also provided radially running slots 49 and 50 and 51 and 52 in the end portions of the torsion load cell 31, respectively. These radial slots run substantially parallel to the axis of the sleeve and core. The central portion of the load cell 31 is necked down to provide a thin annular circumferential surface area to which strain gauge elements 53 and 54 are secured. The elements 53 and 54 are crossed at ninety degrees to each other and form an angle of forty-five degrees with respect to a plane including the axis of the sleeve and core. A second pair of strain gauge elements are secured on the diametrically opposite side of the torsion load cell. By this arrangement, torsional strains established in the load cell 31 will result in tension forces being applied to one of the strain gauge elements and simultaneously compression forces being applied to the other strain gauge element. By connecting the two pairs of diametrically positioned elements in a bridge network in a conventional manner, an accurate reading indicative of the torsion deformation of the load cell 31 is provided.

Note that the direction of the various slots such as 43, 44, and 45 and the intersecting slots 49 and 50 are such that the torsion load cell maintains its rigidity with respect to torsional forces but is relatively flexible or compliant with respect to any of the other forces or moments to which the instrument is subjected. For example, a drag force which would tend to move the sleeve 14 to the right as viewed in Figure 4 and thus provide a tension force on the load cell 31 will have only a small effect on the load cell because of the circumferentially running slots 46, 47, and 48 adjacent the sleeve end 14 and the circumferentially running slots 43, 44, and 45. These slots provide sufficient flexibility that the movement resulting from a drag force substantially is accommodated rather than transmitted to the torsion load cell. Similarly, movements resulting from a side force or lift force will be substantially accommodated by the circumferentially running slots as well as by the radially running slots 49, 50, 51 and 52.

Because the slotted structure at the ends of the load cell cannot, as a practical matter, provide infinite compliance, a small amount of movement as a consequence of a drag force, as well as side and lift forces will be transmitted to the torsion load cell 31. In addition, thermal expansion and contraction of the instrument and its components will also contribute to undesirable movement of the load cell.

The symmetrically disposed torsion load cell 32 of Figure 2 on the right hand side of the instrument will, however, also be subjected to such undesirable movements. Thus, if the corresponding strain gauge elements of the two cells 31 and 32 are connected in parallel in the output bridge circuit, cancellation of the otherwise erroneous readings resulting from such movements of the torsion load cells will be achieved. Therefore, both the slot structure and the symmetrical arrangement of the two end torsion load cells insures a minimum of intercoupling between the roll moment for which these cells are designed to measure and the other forces and moments to which the outer sleeve is subject. As mentioned heretofore, the symmetrical arrangement and paralleling of the strain gauge elements in the bridge circuit effectively also serves to cancel erroneous readings resulting from temperature changes.

Another important consequence of the provision of symmetrically disposed torsion cells is the isolation of any movement due to the roll moment from the rhombic drag cells. Thus, it will be evident that axial forces established in the sleeve as a result of a roll moment will be equal and directed in opposite directions with respect to the center of the sleeve and thus this center and the securing body 39 for the rhombic drag cells will remain stationary. Any compression of the central core will be the same on either side of the body 39 and thus will be cancelled by paralleling the output of the rhombic cells.

Referring now to Figure 5, the guided cantilevered load cell 33 is illustrated in full lines as it would appear from an end view looking in the direction of the arrows 5—5 of Figure 2. The points of securement of the ends of the load cell 33 to the sleeve and the core are shown at 55 and 56 and this attachment is effected by welding. The strain gauge elements employed with the cantilevered load cell 33 are shown at 57 and 58 in Figure 5 and are also designated by these numerals in Figure 2. The vertically aligned strain gauge element 57 will measure tension when the horizontally aligned strain gauge element 58 measures compression and vice-versa. Thus, when the load cell 33 is subjected to a tension force in the event of a negative lift, the strain gauge element 57 will be placed in tension and the strain gauge element 58 placed in compression. Under conditions of a positive lift in which the sleeve portion 14 tends to move upwardly as viewed in Figure 5 the strain gauge element 57 will be placed in compression and the strain gauge element 58 placed in tension. A second pair of strain gauges are disposed on the opposite side of the cell 33 as shown in Figure 5 and the four gauges are connected in a conventional bridge circuit. An angulated access bore shown in dotted lines at 59 is provided to enable the gauge elements to be secured to the load cell.

Referring now to Figure 6, the cantilevered load cell 35 employed for measuring side forces is illustrated as rigidly secured to the sleeve portion 14 as by welding at 60 and to the core portion 23 as by welding at 61. Two strain gauge elements disposed in axial alignment with the axis of the load cell 35 and perpendicular thereto, respectively, are illustrated at 62 and 63. These same elements are shown by the same numerals in Figure 3. As in the case of the lift responsive cantilevered load cell, the load cell 35 will be placed in tension in response to a side load tending to move the sleeve portion 14 to the right as viewed in Figure 6. This load will place the strain gauge element 62 in tension and the strain gauge element 63 in compression. In the event of a side load on the sleeve tending to move it to the left as viewed in Figure 6, the strain gauge element 62 will be placed in compression and the strain gauge element 63 placed in tension. A corresponding pair of strain gauges disposed on the opposite side of the load cell 35 are similarly affected. The two sets of elements illustrated in Figure 6 are connected into a conventional bridge circuit independently of the elements 57 and 58 of Figure 5. An angulated access bore 64 is provided to enable the gauge elements to be placed on the cell.

The guided cantilevered load cells 34 and 36 of Figures 2 and 3 shown to the right of the center lines C and C' are similarly provided with strain gauge elements connected in bridge circuits as described above.

It will be evident, referring once again to Figures 2 and 3, that lift forces will be indicated by the sum of the readings from the load cells 33 and 34 while side forces will be indicated by the sum of the readings from load cells 35, 36. On the other hand, if the test model 10 is subjected to pitching moments which tend to rotate the sleeve of the instrument about a center, as indicated by the arrow P of Figure 1, then the difference registered in the load cells 33 and 34 will provide an indication of this pitching moment. Similarly, if the test body 10 is subjected to yaw moments tending to rotate the body in the direction of the circular arrow Y of Figure 1, the difference in the readings indicated by the load cells 35 and 36 will provide an indication of the yaw moment.

The isolation of the various load cells 33, 34, 35, and 36 from the other forces and moments applied to the sleeve of the instrument is assured by employing the guided cantilevered principle. Thus, for example, when the instrument is subject to a drag force which would tend to move the sleeve of the instrument in an axial direction or in a direction parallel to the core axis, the various cantilevered load cells will develop flexure points at their centers. At these flexure points, there is a minimum of strain deformation developed in the load cells and, therefore, by securing the strain gauge elements to the load cells at their points of flexure, minimum intercoupling is assured.

The interaction between lift and side forces is substantially eliminated by disposing the corresponding load cells at right angles to each other. Thus, again lift forces will only tend to develop deformations in the side force measuring load cells in flexure, and since the strain gauge elements are secured to these flexural points, minimum interference or intercoupling will result.

The access bores 59 and 64 are angulated in two planes so that they will appear at an acute angle with respect to the axis of the sleeve and core as shown in Figures 3 and 2 by the same numerals 59 and 64. By angulating the access openings in this manner, there will never be more than one opening appearing on any one circumferential line passing about either the sleeve or core.

Figure 7 illustrates in detail the second securing means 41 for supporting one end of the rhombic load cell 37 employed to indicate drag forces. The third securing means 42 is identical and therefore description of one will suffice for both. As shown, an anchor bolt 65 passes through the securing means 41 in the form of an anchor bolt sleeve and is threaded into a threaded opening 66 in the core 20. The entrance portion of the threaded opening 66 is provided with a conical surface as shown at 67 arranged to mate with a corresponding conical end portion 68 of the anchor bolt sleeve. By this arrangement, any possibility of play in the securement of the anchor bolt sleeve to the core body is eliminated by proper tightening of the anchor bolt 65 to wedge the conical surfaces together and insure rigidity in the direction of the longitudinal axis of the bore and sleeve. Suitable access holes 41' and 42' shown in Figure 2 enable tightening of the anchor bolts.

As shown in Figure 7, there are provided strain gauge elements 69 and 70 secured to the outside of two arms of the rhombic shaped load cell 37 and strain gauge elements 71 and 72 secured to the inside of these same arms. When the test model 10 is subjected to drag forces, the load cell 37 will be placed in tension and the load cell 38 of Figure 3 placed in compression as described heretofore. Thus, the strain gauge elements 69 and 70 will be placed in compression while the strain gauge elements 71 and 72 will be placed in tension. The corresponding strain gauge elements on the load cell 38 will be affected in just the reverse manner. By paralleling the strain gauge elements in the conventional bridge circuit, the symmetry afforded will cancel out any intercoupling movements resulting from the other forces and moments to which the sleeve is subject. For example, pitching moments may tend to place the load cell 37 either in tension or compression. Because of the symmetry about the dashed line C' shown in Figure 3, however, the load cell 38 will be oppositely affected and thus the net output signal will truly represent only the drag forces and not the other forces or moments involved.

Figure 8:
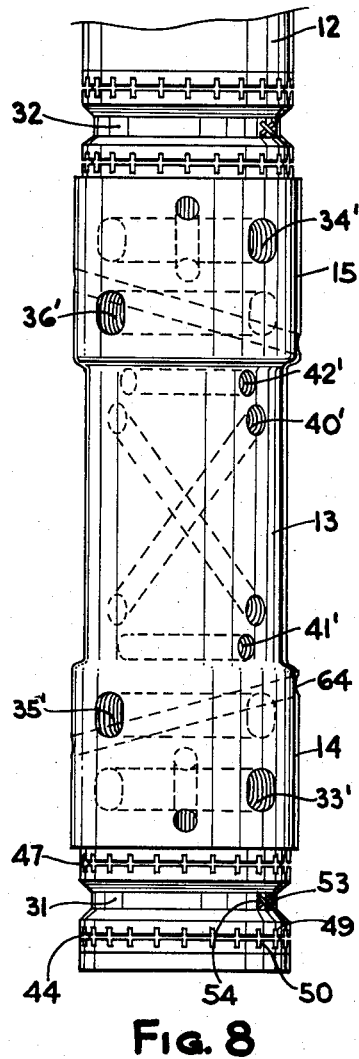
Figure 8 is a plan view of the instrument looking in the direction of the arrow 8 of Figure 5.
Figure 9:
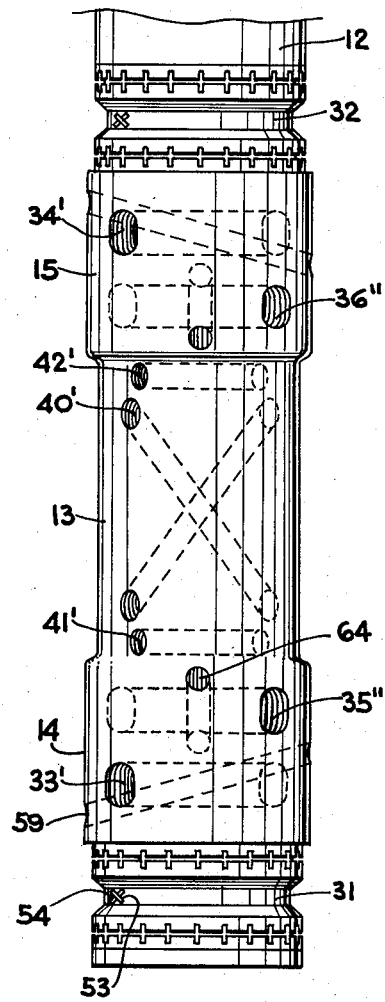
Figure 9 is a view similar to Figure 8 looking in the direction of the arrow 9 of Figure 6.

Figures 8 and 9 illustrate how the ends of the bore openings and access holes are distributed over the surface of the outer sleeve and core to minimize any structural weakening about circumferential portions of the sleeve and core. While only the outer sleeve is visible in Figures 8 and 9, it will be understood that the core openings are correspondingly positioned under the sleeve openings. In Figure 8, the upper opening of the bore accommodating the cantilevered load cell 33 is indicated at 33'. The access opening for inserting strain gauges on the load cell 33 is illustrated at 59 and is also shown in dotted lines in Figure 3. The upper bore opening accommodating the cantilevered load cell 35 is indicated at 35' and the access bore for enabling insertion of strain gauge elements on this load cell is shown at 64 and is also shown in dotted lines in Figure 2. Note that this access opening is in a ninety degree relationship with respect to the access opening 59 since the bores 33' and 35' are at ninety degrees to each other.

The two access openings 41' and 42' are shown in Figure 8 as opening out on the central portion 13 of the sleeve. These bores terminate short of the opposite end of the core and sleeve and thus provide only one opening on any one circumferential portion of the core and sleeve. The various passages for accommodating the rods such as the rod 40 in the central portion of the sleeve are indicated, for example, at 40'.

The bore openings for the cantilevered load cells 34 and 36 are illustrated at 34' and 36', respectively, in the upper portion of Figure 8, and the access openings corresponding to the access openings 59 and 64 are also indicated in dotted lines. Since all of this structure is symmetrical to that already described, it need not be reviewed in detail.

Figure 9 is a view similar to Figure 8 illustrating the outer sleeve as it would appear rotated to the left ninety degrees. In other words, referring to Figures 5 and 6, the relative disposition of the outer sleeve in Figure 9 with respect to Figure 8 will be evident by the directional arrows 9 and 8, respectively.

Thus, in Figure 9, the bore opening 33' is shown towards the left edge of the sleeve and the bottom opening of the bore accommodating the cantilevered load cell 35 appears at 35''. Since this portion is rigidly attached to the sleeve as by welding, no structural weakness in the circumferential portion of the sleeve results, and the only open part of this circumferential portion would be the upper opening 35' as shown in Figure 8.

Similarly, the lower opening of the bore accommodating the cantilevered load cell 36 appears in Figure 9 at 36'' and since the lower end of this cantilevered load cell is rigidly welded to the sleeve, the lower opening 36″ results in no structural weakness of the corresponding circumferential portion of the sleeve. Therefore, the only circumferential portions of the entire sleeve or core structure which include more than one cut out opening therein are the passages accommodating the various rods such as the passage 40′. These passage openings, however, are smaller in diameter than the other openings and do not result in serious structural weakness in these circumferential portions.

All of the various load cells employed in the instrument are extremely rigid in the direction of the principal loads which they are designed to measure. This rigidity is further insured by the direct welding of the ends of the torsion and cantilevered load cells to the core and sleeve. As a result, the actual deflection or movement of the sleeve relative to the central core for even high loads is relatively small and easily accommodated within the gap G so that there is really no physical contact between the sleeve and core other than through the medium of the various load cells. As mentioned heretofore, a consequence of the utilization of rigidity is this resulting small movement notwithstanding very high loads. Therefore, interaction or intercoupling between the load cells employed for measuring different forces or moments is necessarily minimized.

In addition to this minimization through the utilization of rigidity, further elimination of intercoupling is afforded by the incorporated flexibility in the torsion elements by means of the circumferential and radially running slots as described and by the use of the guided cantilevered principle for the load cells employed in measuring lift and side forces. As mentioned, the use of guided cantilevered load cells of this type effectively isolates these load cells from the others in that the only effect that the others can cause are flexural bends which exhibit substantially no movement and thus do not affect the strain gauge elements secured thereto.

Finally, the utilization of a completely symmetrical design insures even further de-coupling in that any intercoupling that does occur will occur symmetrically in corresponding elements and by paralleling the corresponding strain gauges involved, such errors are automatically canceled out. It will also be immediately evident that any intercoupling as a consequence of thermal expansion or contraction will be canceled as a consequence of employing a symmetrical structure.

By using pairs of cantilevered load cells disposed symmetrically on each side of the center portion of the sleeve, both pitch and yaw moments may be measured as described heretofore by simply detecting the difference in the force readings yielded by the respective load cells. Thus, these load cells serve a dual function in affording an indication of both forces and moments.

Referring once again to Figures 2 and 3, the various wires (not shown) from the strain gauge elements are normally led out through the hollow portion 12′ of the mandrel and these wires as well as the strain gauge elements themselves are thoroughly protected.

While a preferred embodiment of the six-component strain gauge balance of this invention has been described, various changes and modifications within the scope and spirit of this invention will occur to those skilled in the art. The force measuring instrument is, therefore, not to be thought of as limited to the specific example set forth for illustrative purposes.

What is claimed is:

1. An instrument for measuring moments comprising: an outer sleeve subject to said moments; a core co-axially positioned in said sleeve and adapted to be secured in a stationary position, said core having an outside diameter less than the inside diameter of said sleeve to leave an annular gap between said core and sleeve, said core extending beyond the ends of said sleeve, one end of said core terminating in an annular increased diameter flange in opposing spaced relationship to one corresponding annular end of said sleeve, the other end of said core terminating in an increased diameter mandrel portion adapted to be held in said stationary position, said increased diameter mandrel portion defining an annular shoulder in opposing spaced relationship to the other corresponding annular end of said sleeve; an annular load cell having its circumferential end portions respectively secured to said increased diameter flange and said one corresponding end of said sleeve; another annular load cell substantially identical to said first mentioned load cell having its circumferential end portions respectively secured to said other corresponding end of said sleeve and said annular shoulder in symmetrical relationship with respect to said first-mentioned load cell, so that application of said moments on said sleeve establish torsional strains in said load cells; and strain gauge means secured to said load cells and responsive to said torsional strains.

2. A high performance instrument for simultaneously measuring forces and moments including, in combination: an outer sleeve having a reduced diameter central portion and enlarged diameter end portions, said enlarged diameter end portions being adapted to be rigidly secured to a body subject to said forces and moments; a mandrel having one end adapted to be rigidly secured in a stationary position, the other end of said mandrel terminating in a central core co-axially positioned within said sleeve, said core having an external diameter less than the internal diameter of said sleeve to leave an annular gap between the exterior of said core and the interior of said sleeve; an annular torsion load cell having its opposite circumferential ends secured respectively to said core and said sleeve such that rotation of said sleeve with respect to said core establishes a torsional strain in said torsion load cell; strain gauge elements secured to circumferential surface portions of said torsion load cell, said sleeve and core having axially displaced diameter bore holes at right angles to each other; guided cantilevered load cells extending respectively into said bore holes perpendicularly to and passing through the axis of said sleeve and core, one end of each of said cantilevered cells being rigidly secured to said sleeve and the other end of each of said cantilevered cells being rigidly secured to said core so that forces acting on said sleeve perpendicularly to the axis of said sleeve tend to displace said sleeve laterally from said core to establish tension and compression strains in said cantilevered load cells; strain gauge elements secured to the central portion of each of said cantilevered load cells, said core including a central recessed area and at least one open passage communicating with said recessed area; support means rigidly secured to said sleeve and passing through said passage to said recessed area to terminate in a first securing means; a second securing means within said recessed area rigidly secured to said core; a rhombic load cell connected between said first and second securing means in alignment with the axis of said sleeve and core so that axial forces acting on said sleeve tend to displace said sleeve in the direction of the axis of said core to establish tension and compression strains in said rhombic load cell; strain gauge elements secured to said rhombic load cell, said sleeve and core being symmetrical on either side of a plane passing midway between the ends of said sleeve in a direction normal to the axis of said sleeve and core, said annular torsion load cell being connected between one end of said sleeve and said core on one side of said plane, said guided cantilevered load cell being positioned between said annular torsion load cell and said one side of said plane, said first securing means being positioned within said recessed area at the point of intersection of said plane and the axis of said sleeve and core, said second securing means being axially displaced a given distance away from said one side of said plane in a position between said one side of said plane and said cantilevered load cell; and additional torsional, guided cantilevered, and rhombic load cells positioned and connected between said sleeve and core on the opposite side of said plane in symmetrical relationship to said first-mentioned torsion, guided cantilevered, and rhombic load cells.

3. The subject matter of claim 2, in which the interior of said sleeve includes axially off-set bore portions and the exterior of said core includes correspondingly positioned off-set core portions, the direction of each off-set corresponding to the direction of said bore openings so that said guided cantilevered load cells are centered with respect to the axis of said sleeve and core.

4. The subject matter of claim 3, in which said circumferential end portions of said annular torsion load cell include: slots extending radially inwardly and running in directions parallel to the axis of said sleeve and core; and radially extending circumferential grooves running in directions at right angles to said slots, whereby said annular torsion load cell is substantially isolated from axial and radial translational movements of said sleeve.

5. The subject matter of claim 4, in which said second securing means includes an anchor bolt sleeve having a conical end portion, said recessed area including a threaded opening having a conical entrance portion for receiving said conical end portion of said anchor bolt sleeve; and an anchor bolt passing through said bolt sleeve and threaded in said opening, the axis of said bolt and bolt sleeve being normal to the axis of said core, said rhombic load cell being secured at one end to said anchor bolt sleeve.

6. The subject matter of claim 5, in which said sleeve and core include access openings in alignment with the axis of said bolt and bolt sleeve to provide access thereto for securing the same, said sleeve and core additionally including access openings extending at acute angles to the axis of said sleeve and core to intersect said axially displaced diameter bore holes at substantially their midpoints to provide access to said cantilevered load cells for the securement of said strain gauge elements thereto, the points of egress of said bore openings, and said access openings being positioned such that no more than two egress openings lie on any one circumferential line about said sleeve and core.

References Cited in the file of this patent
UNITED STATES PATENTS

| | | |
|---|---|---|
| 2,782,636 | Peucker | Feb. 26, 1957 |
| 2,844,027 | Davie | July 22, 1958 |